United States Patent [19]

Ishigami

[11] Patent Number: 4,881,494

[45] Date of Patent: Nov. 21, 1989

[54] ENGINE COOLING APPARATUS FOR AUTOMOTIVE VEHICLE

[75] Inventor: Kazuhiro Ishigami, Sagamihara, Japan

[73] Assignee: Nissan Motor Co., Ltd., Yokohama, Japan

[21] Appl. No.: 167,900

[22] Filed: Mar. 14, 1988

[30] Foreign Application Priority Data

Mar. 16, 1987 [JP] Japan .................................. 62-62091

[51] Int. Cl.$^4$ .............................................. F01P 7/02
[52] U.S. Cl. .................................. 123/41.12; 123/41.49
[58] Field of Search ........................... 123/41.12, 41.49

[56] References Cited

U.S. PATENT DOCUMENTS

| | | | |
|---|---|---|---|
| 4,124,001 | 11/1978 | Samuel et al. | 123/41.12 |
| 4,133,185 | 1/1979 | Dickey | 123/41.12 X |
| 4,257,554 | 3/1981 | Willingham | 123/41.12 X |
| 4,378,760 | 4/1983 | Barge | 123/41.49 X |
| 4,425,766 | 1/1984 | Claypole | 123/41.12 x |
| 4,469,053 | 9/1984 | Sakurai | 123/41.12 |
| 4,560,892 | 5/1986 | Nose et al. | 123/41.12 |
| 4,567,858 | 2/1986 | Hayashi | 123/41.49 X |

FOREIGN PATENT DOCUMENTS

| | | | |
|---|---|---|---|
| 140511 | 8/1982 | Japan | 123/41.49 |
| 96119 | 6/1983 | Japan | 123/41.12 |
| 124017 | 7/1983 | Japan | 123/41.12 |

*Primary Examiner*—E. Rollins Cross
*Attorney, Agent, or Firm*—Foley & Lardner, Schwartz, Jeffery, Schwaab, Mack, Blumenthal & Evans

[57] ABSTRACT

To increase engine power, decrease fuel consumption rate and fan noise, and improve riding comfortability, the engine cooling apparatus provided with a motor-driven cooling fan for an automotive vehicle comprises an engine temperature sensor, a vehicle speed sensor, and a controller for actuating the cooling fan when engine temperature exceeds predetermined values varied according to detected vehicle speed. Further, when an air conditioner is turned on, the cooling fan is actuated irrespective of other conditions.

10 Claims, 3 Drawing Sheets

ENGINE COOLING APPARATUS FOR AUTOMOTIVE VEHICLE

BACKGROUND OF THE INVENTION

1. Field of the Invention

The present invention relates generally to an engine cooling apparatus for an automotive vehicle and more specifically to a cooling apparatus provided with a cooling fan to cool an internal combustion engine, for instance, mounted on an automotive vehicle.

2. Description of the Prior Art

In general, it is necessary to cool an engine so that the engine is driven under an appropriate temperature. In cooling the engine, however, the engine must be cooled with due consideration of engine power, fuel consumption rate, engine running noise, etc. To cool the engine, two, water and air, cooling methods are well known. However, the water cooled engines are more widely adopted. In this water cooled engine, the engine is usually provided with a radiator cooled by a motor-driven fan, as disclosed in Japanese Published Unexamined (Kokai) Utility Model Application No. 60-153817, which is incorporated herein by reference.

In this prior-art engine cooling apparatus, however, since the apparatus is so constructed that the operation of the motor driven fan is controlled according to only the coolant temperature of the engine, there exist various problems as follows:

(1) When the engine is being idled (the vehicle halts), in spite of the fact that the engine output power is small and therefore the coolant temperature usually rises very slowly or may not rise in practice, the motor fan is actuated whenever the coolant temperature exceeds a predetermined value, so that the motor fan is noisy although the coolant temperature can be lowered. During engine idling operation, since engine running noise is low, it is not preferable to drive the motor fan from the standpoint of comfortability. Therefore, when a rise in coolant temperature is small, even if the coolant temperature exceeds a predetermined level, it is preferable not to drive the motor fan in order to reduce noise and improve vehicle comfortability.

(2) When the automotive vehicle is travelling at a high speed, since the radiator is cooled sufficiently, it is unnecessary to drive the motor fan according to circumstances. However, in the prior-art apparatus, since the motor fan starts to operate whenever coolant temperature rises beyond a predetermined temperature value, wasteful engine power is consumed and therefore the engine output is reduced, while increasing the fuel consumption rate. In addition, when the motor fan is being driven, since wind blowing against the radiator when the vehicle is travelling (travel wind) is obstructed by the rotating motor fan, another problem arises in that the cooling efficiency is lowered.

The arrangement of the prior-art engine cooling apparatus for an automotive vehicle will be described in further detail hereinafter.

SUMMARY OF THE INVENTION

With these problems in mind, therefore, it is the primary object of the present invention to provide an engine cooling apparatus for an automotive vehicle which can decrease engine noise, increase engine power, and improve fuel consumption rate and vehicle riding comfortability under due consideration of vehicle speed.

To achieve the above-mentioned object, an engine cooling apparatus provided with a cooling fan for an automotive vehicle, according to the present invention, comprises: (a) means for detecting engine temperature; (b) means for detecting vehicle speed; and (c) means, coupled to said engine temperature detecting means and said vehicle speed detecting means, for controlling cooling fan operation on the basis of detected engine temperature and detected vehicle speed.

The controlling means actuates the cooling fan when the engine temperature detecting means detects an engine temperature higher than one of plural predetermined values determined according to vehicle speed detected by the vehicle speed detecting means.

The plural predetermined temperature values determined according to vehicle speed are a first predetermined temperature value (e.g. 105° C.) for low vehicle speed (e.g. 20 km/h or lower), a second predetermined temperature value (e.g. 100° C.) for middle vehicle speed (e.g. 80 km/h or lower), and a third predetermined temperature value (e.g. 110° C.) for high vehicle speed (e.g. higher than 80 km/h).

Further, when an air conditioner mounted on the vehicle is turned on, the controlling means actuates the ooling fan, irrespective of detected engine temperature and detected vehicle speed.

In the engine cooling apparatus for an automotive vehicle according to the present invention, since the operation of the motor-driven fan is controlled on the basis of vehicle speed in addition to engine coolant temperature or on the basis of engine coolant temperature adjusted according to vehicle speed, it is possible to further finely control the motor fan operation in order to minimize the operating time of the motor fan or to improve fuel consumption rate and riding comfortability, while increasing engine power and decreasing engine noise.

DETAILED DESCRIPTION OF THE PREFERRED EMBODIMENTS

To facilitate understanding of the present invention, reference will be made to a prior-art engine cooling apparatus for an automotive vehicle, with reference to the attached drawing.

Figure 1:
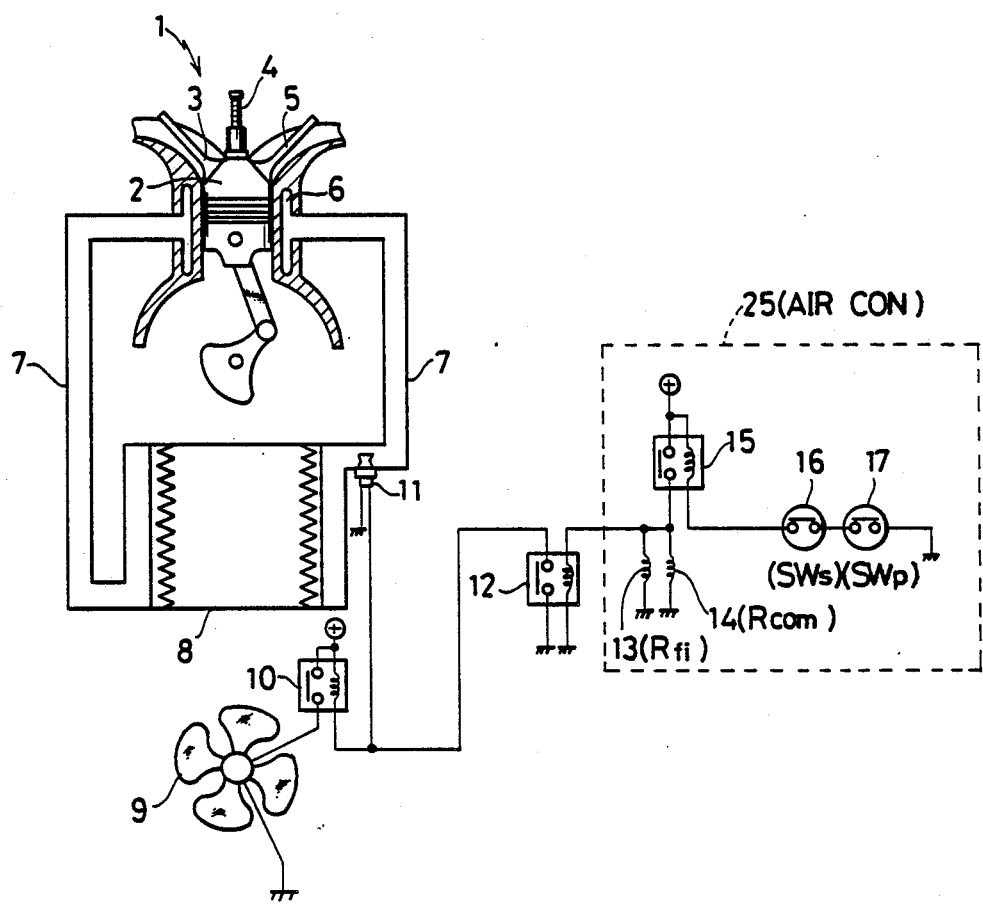
FIG. 1 is a diagrammatical view showing a prior-art engine cooling apparatus provided with a motor driven fan for an automotive vehicle.

In FIG. 1, an engine 1 includes a cylinder 2, an intake valve 3, an ignition plug 4, and an exhaust valve 5. A water jacket 6 is provided for the outer periphery of the cylinder 2. Water jacket 6 is connected to a radiator 8 through a radiator hose 7. Coolant is circulated from the water jacket 6 to the radiator 8 through the hose 7 to radiate heat generated by the engine through the radiator 8. The radiator 8 is cooled by wind blowing against the radiator when the vehicle is travelling (travel wind) or wind generated by a motor driven fan 9, so that coolant temperature is kept within a predetermined temperature range.

The motor fan 9 is controllably driven through a fan relay 10. That is, when the fan relay 10 is energized, since the contact thereof is closed, power is supplied from a battery cell (+), through the fan motor 9, to ground. To energize the fan relay 10, a coolant temperature switch 11 and a control relay 12, connected in parallel to each other, are connected between the fan relay 10 and ground. Therefore, when the temperature switch 11 detects a temperature higher than a predetermined level, switch 11 is closed, so that the fan relay 10 is energized to drive the fan 9. In addition, when the control relay 12 is energized, the motor fan 9 is also driven. Control relay 12 is energized whenever an air conditioner mounted on the vehicle is turned on.

In more detail, an air conditioner control system 25 comprises a fast idle solenoid ($R_{fi}$) 13, a compressor clutch solenoid ($R_{com}$) 14, an air conditioner relay 15, an air conditioner start switch ($SW_S$) 16 and a refrigerant pressure switch $SW_P$ 17. The fast idle solenoid 13 serves to increase an air passage area of the engine 1 (i.e. idle speed) when the air conditioner is turned on; the compressor clutch solenoid 14 serves to start an air conditioner compressor. The air conditioner start switch 16 serves to start the air conditioner; the refrigerant pressure switch 17 serves to detect whether the refrigerant pressure lies within a predetermined range.

Therefore, when the air conditioner start switch 16 is closed under the condition that the refrigerant pressure switch 17 is being closed, the air conditioner relay 15 is energized, so that the control relay 12, the fast idle solenoid 13 and the compressor clutch solenoid 14 are all energized simultaneously (power is supplied from the battery (+), through these solenoids, to ground). When the control relay 12 is energized, since the motor fan relay 10 is also energized, the motor fan 9 is driven to cool the engine when the air conditioner is turned on. In summary, the motor fan 9 is driven when coolant temperature is high and when the air conditioner is being operated.

As explained already, in the prior-art engine cooling apparatus, since the motor fan 9 is actuated even during engine idling, whenever coolant temperature rises beyond a predetermined value, the engine is noisy. On the other hand, since the motor fan 9 is actuated even during vehicle travelling, whenever coolant temperature rises beyond the same predetermined value, the engine power is wasted or fuel consumption rate is increased or cooling efficiency is lowered.

In view of the above description, reference is now made to an embodiment of the engine cooling apparatus for an automotive vehicle according to the present invention.

Figure 2:
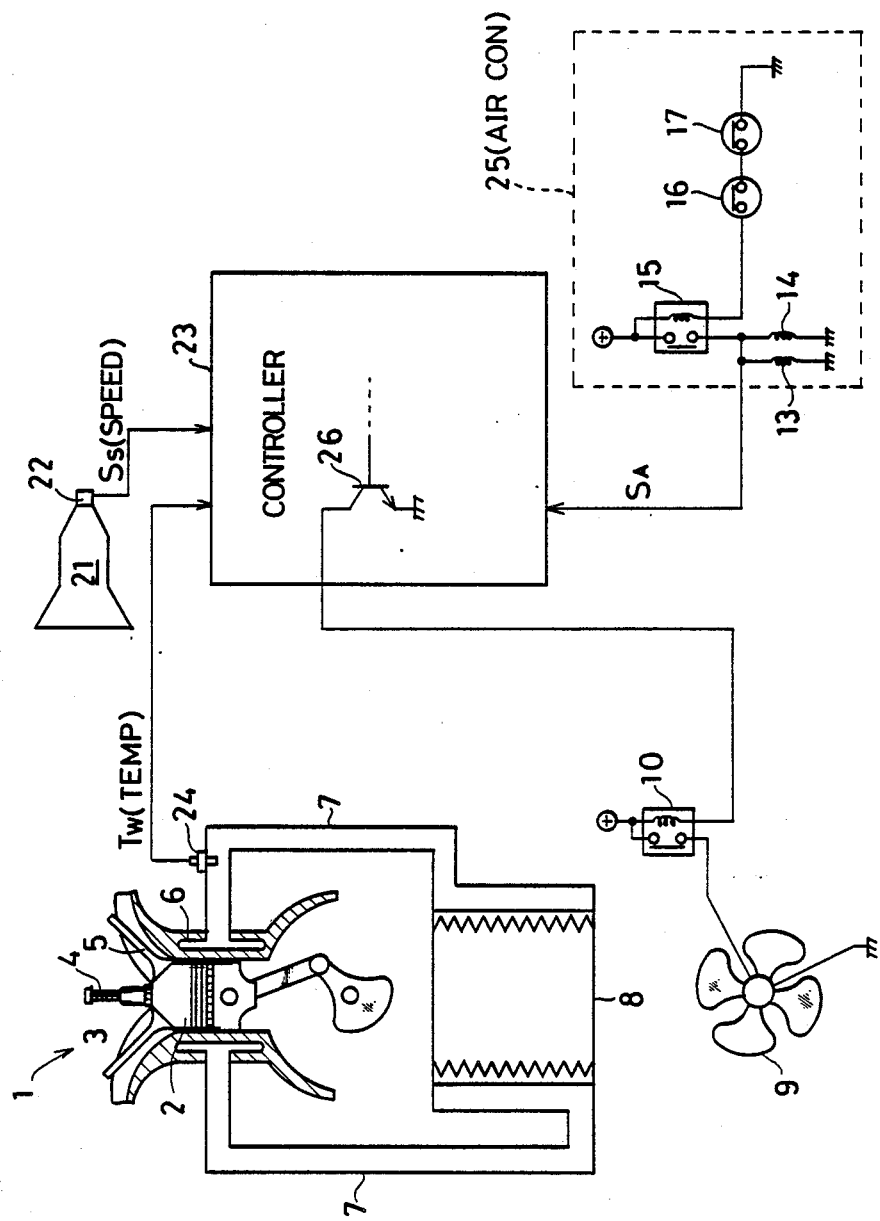
FIG. 2 is a diagrammatical view including a schematic block diagram showing an embodiment of the engine cooling apparatus for an automotive vehicle of the present invention.

FIG. 2 shows an embodiment of the engine cooling apparatus thereof, in which the same reference numerals as shown in FIG. 1 have been retained for similar parts or sections which have the same functions, without repeating the description thereof.

In FIG. 2, the apparatus further comrises a vehicle speed sensor (vehicle speed detecting means) 22 for detecting vehicle speed $S_S$ on the basis of the revolution of a drive shaft (not shown) of an automatic transmission 21, a coolant temperature sensor (engine temperature detecting means) 24 attached to a radiator hose 7 to detect engine coolant temperature $T_W$; and a controller (e.g. CPU) 23 to which a vehicle speed signal $S_S$, a coolant temperature signal $T_W$, and an air conditioner on-off signal $S_A$ are inputted. The vehicle speed sensor 22 is an electromagnetic pickup, for instance; the coolant temperature sensor 24 is a thermistor, the controller 23 is a microcompute. Controller 23 energizes a fan relay 10 to drive a motor fan 9 through a switching means (e.g. transistor) 26 on the basis of the three sensor signals $S_S$, $T_W$ and $S_A$ in accordance with a program stored therewithin. In more detail, the controller 23 energizes the fan relay 10 to drive the motor fan 9 (1) when the air conditioning system 25 is turned on, or (2) when coolant temperature exceeds predetermined engine coolant temperatures previously determined according to vehicle speed.

Figure 3:
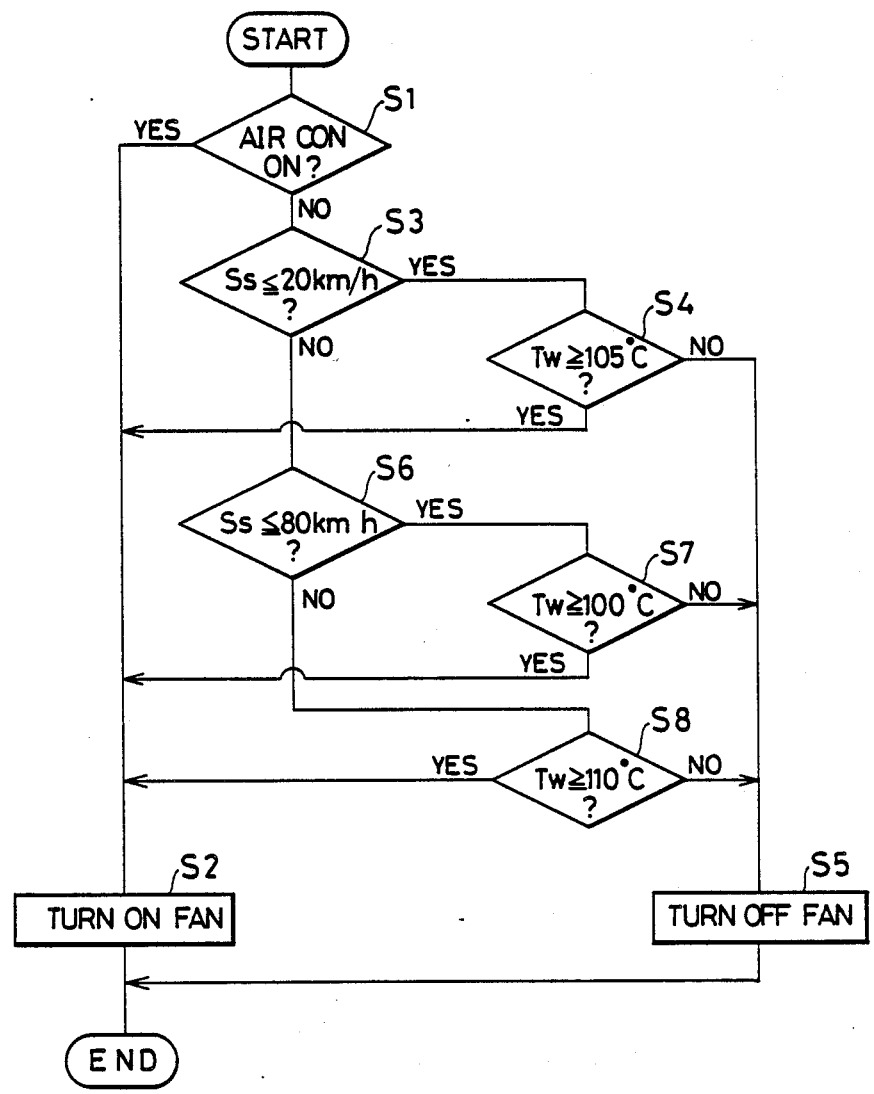
FIG. 3 is a flowchart for assistance in explaining the control operation of the motor fan incorporated in the engine cooling apparatus for an automotive vehicle shown in FIG. 2.

FIG. 3 is a flowchart showing a motor fan controlling program executed by the controller 23, by way of example. The program is executed for each predetermined time period (e.g. 10 msec).

In FIG. 3, control first checks whether the air conditioner 25 is ON or OFF on the basis of the air conditioner signal $S_A$ (in step S1). If YES, the motor fan 9 is turned on to cool the engine irrespective of vehicle speed $S_S$ and coolant temperature $T_W$ (in step S2). If NO in step S1, the motor fan 9 is controlled on the basis of vehicle speed $S_S$ and coolant temperature $T_W$ as follows:

Control checks whether the current vehicle speed is a low speed (20 km/h or lower, for instance) (in step S3). If YES in step S3, control determines that the vehicle is travelling at a low speed or halt, proceeding to the succeeding step S4 to check whether the current coolant temperature $T_W$ is a first (medium) temperature value (e.g. 105° C.) for a low speed or higher (in step S4). If YES (105° C. or higher) in step S4, the motor fan 9 is turned on (in step S2). If NO (lower than 105° C.) (in step S4), the motor fan 9 is turned off (in step S5).

If NO (higher than 20 km/h) (in step S3), control checks whether vehicle speed is a medium speed (e.g. 80 km/h or lower) (in step S6). If YES in step S6, control determines that the vehicle is travelling at a medium speed (20 to 80 km/h), proceeding to the succeeding step S7 to check whether the current coolant temperature $T_W$ is a second (low) temperature (e.g. 100° C.) for a medium speed (in step S7) or higher. If YES (100° C. or higher), the motor fan 9 is turned on (in step S2). If NO (lower than 100° C.) (in step S7), the motor fan 9 is turned off (in step S5). If NO (higher than 80 km/h) (in step S6), control checks whether the current coolant temperature $T_W$ is a third (high) temperature (e.g. 110° C.) for a high speed (in step S8) or higher. If YES (110° C. or higher), the motor fan 9 is turned on (in step S2). If NO (lower than 110° C.) (in step S8), the motor fan 9 is turned off (in step S5).

In step S4, the first preset (medium) temperature (105° C.) for a low speed (20 km/h or lower) is set higher than the second preset (low) temperature (e.g. 100° C.) for a medium speed (20 to 80 km/h). This is because when the vehicle speed is low, the speed of travel wind blowing against the radiator during vehicle travelling is low. Further, in step S8, the third preset (high) temperature (110° C.) for a high speed (80 km/h or higher) is set higher than the other preset temperatures (100°, 105° C.) for low and medium speeds (80 km/h or lower). This is because when the vehicle speed is high, the speed of travel wind blowing against the radiator during vehicle travelling is high.

The above-mentioned relationship between the motor fan on-off operation and the detected sensor signals $S_S$, $T_W$, $S_A$ is listed in an attached Table 1 to facilitate understanding of the control operation.

In Table 1, when the air conditioner (A/C) is turned on ($S_A$ is ON), the motor fan is turned on irrespective of other conditions; (1) when the vehicle is travelling at low speed or halts (vehicle speed $S_S$ is 20 km/h or lower), the motor fan is turned on if engine coolant temperature $T_W$ is 105° C. or higher but off if $T_W$ is lower than 105° C. (2) when the vehicle is travelling at medium speed ($S_S$ is higher than 20 but 80 km/h or lower), the motor fan is turned on if $T_W$ is 100° C. or higher but off if $T_W$ is lower than 100° C.; and (3) when the vehicle is travelling at high speed ($S_S$ is higher than 80 km/h), the motor fan is turned on if $T_W$ is 110° C. or higher but off if $T_W$ is lower than 110° C.

As described above in the engine cooling apparatus according to the present invention, the motor fan 9 is operated on the basis of vehicle speed and coolant temperature in such a way that the motor fan 9 is operated only when the engine should be cooled. Some test results have indicated that when a vehicle travels at low speed on an urban busy street in summer, the operating frequency that the motor fan 9 is turned on was reduced from 80% (prior art) to 10% (invention). Further, when a vehicle travels at high speed on an expressway in summer, the same operating frequency was reduced from 50% (prior art) to 20% (invention). Since the operating frequency is reduced and therefore the operating time of the motor fan can be reduced, engine noise is reduced and thereby the vehicle riding comfortability can be improved, particularly when the engine is being idled. Further, at high speed travel, since the motor fan is operated only when necessary, travel wind can be directly introduced to the radiator without being obstructed by the motor fan, it is possible to improve cooling efficiency, decrease fuel consumption rate and increase engine power.

TABLE 1

| | SPEED [$S_S$] (km/h) | TEMP [$T_W$] (°C.) | A/C($S_A$): ON | A/C($S_A$): OFF |
|---|---|---|---|---|
| LOW SPEED TRAVEL OR HALT | $S_S \leq 20$ | $T_W < 100$ | o | x |
| | | $100 \leq T_W < 105$ | o | x |
| | | $105 \leq T_W < 110$ | o | o |
| | | $110 \leq T_W$ | o | o |
| MIDDLE SPEED TRAVEL | $20 < S_S \leq 80$ | $T_W < 100$ | o | x |
| | | $100 \leq T_W < 105$ | o | o |
| | | $105 \leq T_W < 110$ | o | o |
| | | $110 \leq T_W$ | o | o |
| HIGH SPEED TRAVEL | $80 < S_S$ | $T_W < 100$ | o | x |
| | | $100 \leq T_W < 105$ | o | x |
| | | $105 \leq T_W < 110$ | o | x |
| | | $110 \leq T_W$ | o | o | o: FAN IS ON
x: FAN IS OFF

What is claimed is:

1. An engine cooling apparatus provided with a cooling fan for an automotive vehicle, comprising:
   (a) means for detecting engine temperature;
   (b) means for detecting vehicle speed; and
   (c) means, coupled to said engine temperature detecting means, for actuating the cooling fan when the engine temperature detecting means detects an engine temperature higher than one of plural predetermined temperature values corresponding to vehicle speed detected by the vehicle speed detecting means.

2. The engine cooling apparatus of claim 1, wherein the plural predetermined temperature values determined according to vehicle speed are a first predetermined temperature value for low vehicle speed, a second predetermined temperature value for middle vehicle speed and a third predetermined temperature value for high vehicle speed.

3. The engine cooling apparatus of claim 2, wherein the first predetermined temperature value for low vehicle speed is higher than the second predetermined temperature value for middle speed but lower than the third predetermined temperature value for high vehicle speed.

4. The engine cooling apparatus of claim 1, which further comprises means, coupled to said controlling means, for detecting that an air conditioner mounted on the vehicle is turned on, said controlling means actuating the cooling fan, when said air conditioner detecting means detects that the air conditioner is turned on, irrespective of detected engine temperature and detected vehicle speed.

5. A method of controlling a cooling fan provided for an engine for an automotive vehicle, which comprises the following steps of:
   (a) comparing vehicle speed with a first predetermined speed value;
   (b) if vehicle speed is the first predetermined speed value or lower, comparing engine temperature with a first predetermined temperature value;
   (c) if engine temperature is the first predetermined temperature value or higher, actuating the cooling fan;
   (d) if engine temperature is lower than the first predetermined temperature value, deactuating the cooling fan;
   (e) if vehicle speed is higher than the first predetermined speed in step (a) above, comparing vehicle speed with a second predetermined speed value higher than the first predetermined speed value;
   (f) if vehicle speed is the second predetermined speed value or lower, comparing engine temperature with a second predetermined temperature value lower than the first predetermined temperature value;
   (g) if the engine temperature is the second predetermined temperature value or higher, actuating the cooling fan;

(h) if engine temperature is lower than the second predetermined temperature value, deactuating the cooling fan;

(i) if vehicle speed is higher than the second predetermined speed in step (e) above, comparing engine temperature with a third predetermined temperature value higher than the first and second predetermined temperature value;

(j) if the engine temperature is the third predetermined temperature value or higher, actuating the cooling fan; and (k) if the engine temperature is lower than the third predetermined temperature, deactuating the cooling fan.

6. The method of claim 5, which further comprises the following steps of:

(a) checking whether an air conditioner installed on the vehicle is turned on or off; and (b) if on, actuating the cooling fan irrespective of detected vehicle speed and engine temperature.

7. An engine cooling apparatus provided with a cooling fan for an automotive vehicle, comprising:

(a) means for detecting engine temperature;
(b) means for detecting vehicle speed; and
(c) means, coupled to said engine temperature detecting means and said vehicle speed detecting means, for controlling cooling fan operation on the basis of detected engine temperature and detected vehicle speed, said controlling means actuates the cooling fan when said engine temperature detecting means detects an engine temperature higher than one of plural predetermined temperature values corresponding to vehicle speed detected by said vehicle speed detecting means and the plural predetermined temperature values corresponding to vehicle speed include a first predetermined temperature value for low vehicle speed, a second predetermined temperaure value for medium vehicle speed and a third predetermined temperature value for high vehicle speed.

8. The engine cooling apparatus of claim 7, wherein the first predetermined temperature value for low vehicle speed is higher than the second predetermined temperature value for medium speed but lower than the third predetermined temperature value for high vehicle speed.

9. An engine cooling apparatus provided with a cooling fan for an automotive vehicle, comprising:

(a) means for detecting engine temperature;
means for detecting vehicle speed; and
(c) means, coupled to said engine temperature detecting means and said vehicle speed detecting means, for actuating the cooling fan when said engine temperature detecting means detects an engine temperature higher than one of a first predetermined temperature value for low vehicle speed, a second predetermined temperature value for medium vehicle speed and a third predetermined temperature value for high vehicle speed.

10. The engine cooling apparatus of claim 9, wherein the first predetermined temperature value for low vehicle speed is higher than the second predetermined temperature value for medium speed but lower than the third predetermined temperature value for high vehicle speed.

* * * * *